United States Patent Office 3,373,137
Patented Mar. 12, 1968

3,373,137
NITROGEN-CONTAINING ORGANOSILICON
COMPOUNDS AND THEIR PREPARATION
John C. Saam, Midland, Mich., assignor to Dow
Corning Corporation, Midland, Mich., a corporation of Michigan
No Drawing. Continuation-in-part of application Ser. No. 195,970, May 18, 1962. This application Jan. 4, 1963, Ser. No. 249,314
31 Claims. (Cl. 260—46.5)

This invention relates to organosilicon imido ester hydrohalides, (imidazolinyl-2)alkyl-silanes, siloxanes and the salts of such silanes and siloxanes and to methods for their preparation. This application is a continuation-in-part of my copending application Ser. No. 195,970, filed May 18, 1962, and now abandoned.

It is an object of this invention to prepare (imidazolinyl-2)alkyl-silanes and siloxanes and their salts. It is a further object to prepare novel organosilicon imido ester hydrohalides which are useful in preparing these (imidazolinyl-2)alkyl-silanes and siloxanes. It is a further object to prepare novel copolymers containing units of either the (imidazolinyl-2)alkyl-siloxanes or the salts of (imidazolinyl-2)alkyl-siloxanes.

The novel organosilicon imido ester hydrohalides of this invention are of the general formula

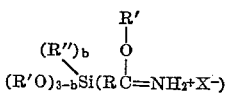

wherein R′ is a monovalent hydrocarbon radical containing no aliphatic unsaturation, R″ is a monovalent saturated hydrocarbon radical, R is a divalent saturated aliphatic hydrocarbon radical containing at least two carbon atoms, there being at least two carbon atoms between the silicon atom and the carbon atom which is bonded to nitrogen, X is a halogen atom selected from the group consisting of chlorine, bromine and iodine atoms and $b$ is an integer of less than 4.

Illustrative of these organosilicon imido ester hydrohalides are silane imido ester hydrochlorides, hydrobromides and hydroiodides. Preferably X is a chlorine atom. R in the above formula is a divalent saturated aliphatic hydrocarbon radical containing at least two carbon atoms, there being at least two carbon atoms between the silicon atom and the carbon atom bonded to nitrogen. Illustrative of the divalent saturated aliphatic hydrocarbon radicals that R represents are —CH$_2$CH$_2$—,

—CH$_2$CH(CH$_3$)—

—CH$_2$CH$_2$CH$_2$—, —CH$_2$CH(CH$_2$CH$_3$)CH$_2$—

—CH$_2$(CH$_2$)$_4$CH$_2$— and —CH$_2$(CH$_2$)$_8$CH$_2$—. In each case there is at least two carbon atoms between the silicon atom and the carbon atom which is bonded to nitrogen. Preferably R has either 2 or 3 carbon atoms, such as ethylene and propylene. R′ in the above formula is a monovalent hydrocarbon radical containing no aliphatic unsaturation. Specific examples of such radicals are alkyl radicals, such as methyl, ethyl, t-butyl and octadecyl; cycloalkyl radicals, such as cyclobutyl, cyclopentyl and cyclohexyl; aralkyl radicals, such as benzyl and aryl groups such as phenyl and xenyl. Preferably R′ is an alkyl radical. The preferred alkyl radicals are those containing from 1 to 4 inclusive carbon atoms (e.g., methyl and ethyl). R″ is a monovalent saturated hydrocarbon radical. Specific examples of such alkyl and cycloalkyl radicals have been set forth above. The subscript $b$ in the above formula is an integer of less than 4. Thus, the above formula represents compounds containing from 0 to 3 R″ radicals and from 0 to 3 silicon-bonded OR′ radicals. The compounds containing from 2 to 3 silicon-bonded OR′ radicals are of the most value as intermediates.

These organosilicon imido ester hydrohalides are prepared from cyanoalkylhalogenosilanes (i.e., where $b$ has a value of less than 3) by the reaction of the silane with an alcohol in accordance with the following equation:

A.

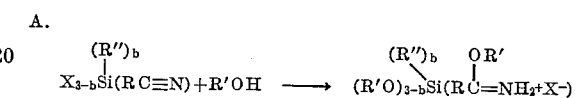

These organosilicon imido ester hydrohalides are prepared from cyanoalkylalkoxysilanes (which contain no halogen atoms), by the reaction of the silane with an alcohol and a hydrohalide in accordance with the following equation:

B.

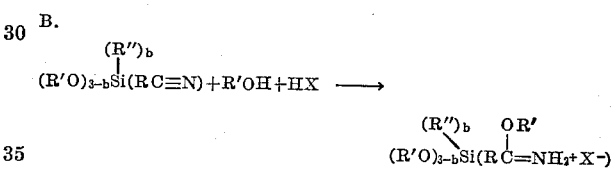

R, R′, R″, X and $b$ in both equations are as defined above. Both reactions occur when the reactants are mixed in a suitable inert solvent. These reactions take place at low temperatures, e.g. 0° C. Any solvent in which the ingredients are soluble and which does not interfere with the reaction can be used. Suitable solvents include ethers and hydrocarbon solvents. At least one mol of acid per mol of cyanoalkylsilane is required in Equation B.

These organosilicon imido ester hydrohalides can be used to prepare [2-(imidazolinyl-2)]alkylsilanes of the general formula

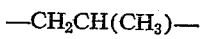

wherein R, R′, R″ and $b$ are as defined above. There are at least two carbon atoms between the 2-(imidazolinyl-2) radical and the silicon atom (i.e., in the R radical). Y is either a hydrogen atom, or a monovalent saturated hydrocarbon radical. Suitable examples of such radicals have been set forth above for R″. Preferably R′ and R″ are alkyl radicals and $b$ has a value of 1. The preferred alkyl radicals are those containing from 1 to 4 inclusive carbon atoms (e.g., methyl, ethyl, propyl and butyl). Preferably R is an ethylene or propylene radical and Y is a hydrogen atom. The 2(imidazolinyl-2)alkyl silane can be prepared by the reaction of an organosilicon imido ester hydrohalide with a diamine in accordance with the general equation:

C.
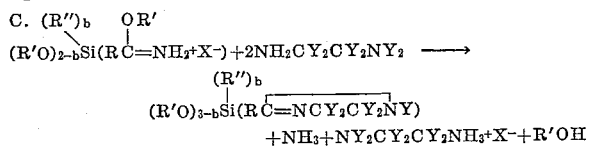
$+NH_3+NY_2CY_2CY_2NH_3{}^+X^-+R'OH$

Examples of suitable diamines include ethylene diamine, dl-1,2-propanediamine and 1,2-butanediamine. This reaction occurs when the organosilicon imido ester hydrohalide and the diamine are mixed together and heated. The temperature at which this reaction is conducted is not critical, other than it must be sufficient so that the resulting ammonia is removed. The reaction is preferably conducted at reflux temperature. Although it is not essential that a solvent be used, it is preferable to use a solvent in which the organosilicon imido ester hydrohalide and diamine are soluble and which does not interfere with the reaction. Suitable solvents include alcohols such as ethanol.

This invention also relates to a [1-(imidazolinyl-2)] alkylsilane which is produced by a different method. The [1-(imidazolinyl-2)]alkyl silane is of the general formula

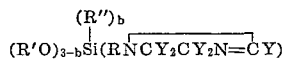

R, R', R", Y and b are as defined above. There are at least two carbon atoms between the imidazolinyl radical and the silicon atom. The [1-(imidazolinyl-2)]alkylsilane is obtained by the reaction of an aminated silane and an orthoester in accordance with the general equation:

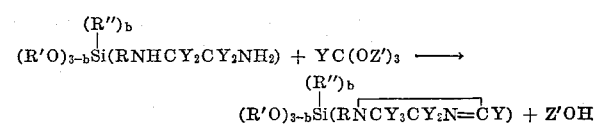
$+Z'OH$

R, R', R", Y and b are as defined above. Z' is a monovalent hydrocarbon. Preferably Z' is an alkyl radical. Alkyl radicals of from 1 to 4 inclusive carbon atoms are preferred (e.g., methyl and ethyl). It should be pointed out that there are at least two carbon atoms between the NHCY$_2$CY$_2$NH$_2$ radical and the silicon atom in the aminated silane (i.e., in the R radical). Methods for producing these aminated silanes are well known in the art (e.g., Speier, U.S. Patent 2,971,864). This reaction occurs when the aminated silane and the orthoester are heated at a temperature sufficient to effect the reaction. Although the temperature at which the reaction is effected is not critical, temperatures between 100 to 250° C. are preferred. Best results are obtained when temperatures between 170° C. and 200° C. are used. Although this reaction can be conducted in an open vessel, best results are obtained when the reaction is conducted in a closed system, such as a bomb. Although it is not essential that a solvent be used, a solvent in which the reactants are soluble and which does not interfere with the reaction can be used. Suitable solvents include ethers, such as diethylether.

This invention also relates to a [5-(imidazolinyl-2)] alkylsilane of the general formula

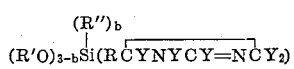

and a [4-(imidazolinyl-2)]alkylsilane of the general formula

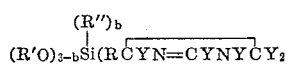

R, R', R", Y and b are as defined above. These silanes are tautomers and are also produced by the reaction of an aminated silane and an orthoester in accordance with the general equation:

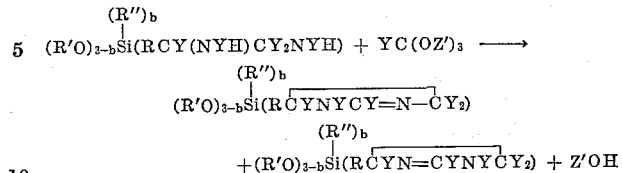
$+Z'OH$

Z' is as defined above. This reaction occurs under the same conditions as the reaction used to prepare the [1-imidazolinyl-2)]alkylsilane.

The term Z in the claims represents the following types of (imidazolinyl-2) radicals, i.e. the

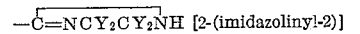 [2-(imidazolinyl-2)]

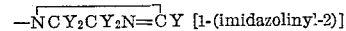 [1-(imidazolinyl-2)]

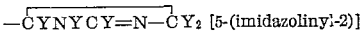 [5-(imidazolinyl-2)]

and

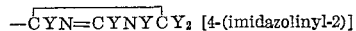 [4-(imidazolinyl-2)]

radicals.

This invention also relates to salts of all four types of (imidazolinyl-2)alkylsilanes. The silane salts have the general formulae:

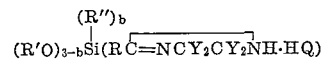

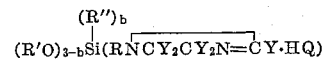

and

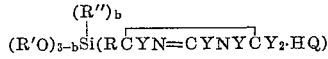

Q is either a halogen atom or a

radical wherein M is either an alkyl or phenyl radical. Suitable examples of the hydrohalides include HBr, HCl, HI, and HF. Suitable examples of the

radical include benzoate, formate, acetate, butyrate laurate and stearate. The preferred salt is hydrochloride. These silane salts can be prepared by the reaction of the imidazolinylalkylsilane and the proper acid or its ammonium salt. This reaction proceeds rapidly at reflux temperatures. It is preferred to use an ammonium halide or ammonium carboxylate, such as ammonium chloride or ammonium acetate.

This invention also relates to the salts of imidazolinylalkylsiloxanes of the general formula

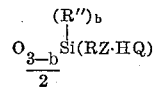

wherein R, R", Z, Q and b are as defined above. These siloxanes are prepared by merely hydrolyzing the corresponding imidazolinylalkylsilane salt. Conventional hydrolysis and condensation techniques can be used for this polymerization.

Imidazolinylalkylsiloxanes of the general formula

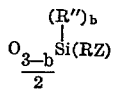

can be prepared by neutralizing the corresponding imidazolinylalkylsiloxane salt with a suitable base, such as a strong amine. The neutralization is best carried out in a hydrocarbon solvent. R, R″, Z and b are as defined above.

This invention also relates to siloxanes consisting essentially of (A) at least one unit of the formula

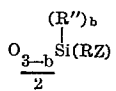

and (B) units of the formula

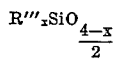

wherein R‴ is either a monovalent hydrocarbon or halogenated hydrocarbon radical and x has a value of from 1 to 3 inclusive. Suitable examples of such halogenated hydrocarbon radicals are 3,3,3-trifluoropropyl, p-fluorobenzyl, 3-fluorocyclohexyl, bromophenyl and chloromethyl. The preferred conventional siloxane units are $(CH_3)_2SiO$, $(CH_3)(C_6H_5)SiO$ and $(CH_3)(C_2H_5SiO$. These siloxane copolymers can be prepared by conventional copolymerization techniques. For example, the conventional siloxane and the imidazolinylalkylsiloxane can be mixed together and heated. Temperatures of from 60° C. to 100° C. are usually satisfactory. Another method of preparing these siloxane copolymers is by mixing and heating the imidazolinylalkylsiloxane and a conventional cyclic siloxane. Still another method of preparing these siloxane copolymers is by mixing an imidazolinylalkylsilane which contains at least one silicon-bonded OR' radical with a conventional hydroxyl-containing siloxane. Imidazolinylalkylsiloxy-end-blocked siloxanes are prepared when the conventional siloxane reactant is hydroxyl-end-blocked. This reaction generally takes place at room temperature, although temperatures of from 100 to 200° C. are preferred.

Copolymers containing at least one unit of the formula

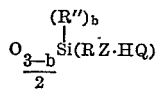

and units of the formula

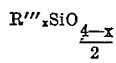

can be prepared by the above techniques. These salts can also be prepared from the copolymers of imidazolinylalkylsiloxane and conventional siloxanes by the reaction of the copolymers with an acid or its ammonium salt. This reaction was described in detail above.

As indicated above, the organosilicon imido ester hydrohalides are useful in preparing [2-(imidazolinyl-2)]-alkylsilanes (i.e., those containing the

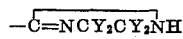

radical) and their salts. The imidazolinyl-containing silanes, siloxanes and siloxane copolymers and the salts thereof of this invention are useful as emulsifying agents.

The salts of imidazolinyl-alkoxy-silanes and of imidazolinylsiloxanes and copolymers containing a salt of an imidazolinylsiloxane are especially useful as antistatic agents for organic articles. These antistatic agents are employed in conditioning an organic article which, in the dry state, normally tends to accumulate static charges of electricity thereon, whereby this tendency is minimized or obviated. Such articles include certain textile materials in fiber, fabric, or other form and certain sheet materials, e.g., cellulose esters or other materials used in making photographic films and phonographic records made of vinyl resins. These antistatic agents are particularly useful as antistatic finishes for fibers or fabrics composed of or comprising substantial proportion of silk, nylon, wool, viscose rayon, polyesters, cellulose acetate or cellulose ester rayons, vinyl resins, including homopolymeric or copolymeric acrylic and other thermoplastic vinyl resins. Especially good results are obtained when these antistatic agents are used on nylon fibers and fabrics. These antistatic agents are best applied to the organic article by preparing an aqueous dispersion containing the antistatic agent and then applying the dispersion to the organic article. The dispersion can be applied, for example, by immersing the organic article in the dispersion or by spraying, padding, brushing or otherwise contacting the article with the dispersion. The preferred method of application is by dipping the organic article in the dispersion. The antistatic composition can then be cured by subjecting the organic article to heat for a brief period of time. Temperatures of from 150° F. to 300° F. are usually sufficient to effect the desired cure.

The amount of antistatic composition which is present on the dry treated article can vary considerably, but ordinarily is present thereon in an amount by weight from 0.2 to 10 percent of the dry untreated article. The best results are obtained when the antistatic composition is present on the organic article at an amount from 2 to 5 percent by weight. The concentration of the antistatic composition in the bath will depend upon the organic article to be treated and the amount of antistatic composition to be deposited upon the article.

The hydrochloride salts of imidazolinylalkoxysilanes, imidazolinylsiloxanes and copolymers containing a hydrochloride salt of the imidazolinylsiloxane are preferred for this use. In respect to fibers or fabric, these antistatic agents can be applied at any suitable stage of the production of the fiber or fabric, or during its fabrication into other forms. For example, the antistatic composition can be applied during stretching of a wet-spun yarn or fiber, or during the spinning process, or the winding or twisting process. These antistatic compositions can also be applied to the finished fabric.

This invention also relates to quaternary ammonium halides of the formula

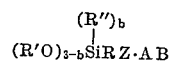

wherein R, R′, R″, b and Z are as previously defined, A is alkyl, aralkyl or cycloalkyl and B is halogen.

Radical A can be any monovalent alkyl, aralkyl or cycloalkyl radical. Thus, A can be alkyl such as methyl, ethyl, propyl, butyl and octadecyl; aralkyl such as benzyl, phenylethyl and 2-phenylpropyl; and cycloalkyl such as cyclobutyl and cyclohexyl. Halogen B can be any of the four halogens fluorine, chlorine, bromine and iodine. Thus, monohalohydrocarbon AB can be an alkyl halide such as methyl iodide, ethyl fluoride or octadecyl bromide; an aralkyl halide such as benzyl bromide or phenylethyl chloride; or a cycloalkyl halide such as cyclopentyl bromide.

The silane salts have the general formulae:

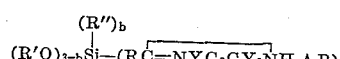

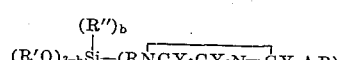

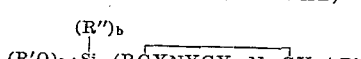

and

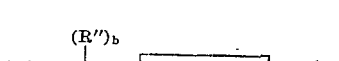

The preferred salts are the methyl iodides. These silane salts can be prepared easily by the reaction of the imidazolinylalkylsilane and the proper halohydrocarbon. The reaction normally proceeds at room temperature, although higher temperatures (i.e., 50–150° C.) are often employed to hasten the rate of reaction. The reaction can be carried out in an inert organic solvent (e.g., heptane, toluene, etc.) if desired.

This invention also relates to quaternary ammonium salts of imidazolinylalkylsiloxanes of the general formula

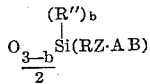

wherein R, R″, Z, A, B and b are as previously defined. These salts are prepared by merely hydrolyzing the corresponding imidazolinylalkylsilane quaternary salt. Conventional hydrolysis and condensation techniques can be used for this polymerization. Alternatively, an imidazolinylalkylsiloxane can be reacted with the proper monohalohydrocarbon to produce the corresponding siloxane quaternary salt. The reaction conditions are the same here as for the preparation of the silane quaternary salt above.

This invention also relates to siloxanes consisting essentially of (1) at least one unit of the formula

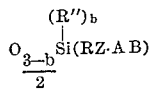

and (2) units of the formula

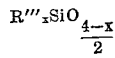

wherein R, R″, R‴, Z, A, B, b and x are as previously defined. The preferred conventional siloxane units are $(CH_3)_2SiO$, $(CH_3)(C_6H_5)SiO$ and $(CH_3)(C_2H_5)SiO$ wherein x in this portion of the copolymer has an average value of about 2. These siloxane copolymers can be prepared by conventional techniques. For example, the conventional siloxane and the imidazolinylalkylsiloxane quaternary halide can be mixed together and heated, temperatures of from 60 to 100° C. being usually satisfactory. Another method of preparing these siloxane copolymers is by mixing and heating the quaternary imidazolinylalkylsiloxane salt and a conventional cyclic siloxane. Still another method of preparing these siloxane copolymers is by mixing a quaternary halide of an imidazolinylalkylsilane which contains at least one silicon-bonded OR′ radical with a conventional hydroxyl-containing siloxane. Quaternary halide salts of imidazolinylalkylsiloxy-end-blocked siloxanes are prepared when the conventional siloxane reactant is hydroxyl-end-blocked. This reaction generally takes place at room temperature, although temperatures of from 100 to 200° C. are preferred.

The above-described siloxane copolymers can be prepared by reacting a monohalohydrocarbon as previously defined with a copolymer containing conventional siloxane units and imidazolinylalkylsiloxane units. This reaction proceeds as described for the preparation of the quaternary salts of imidazolinylalkylsilanes.

The above described quaternary ammonium salt silanes, siloxanes and copolymers containing them are especially useful as antistatic agents for organic articles. A detailed discussion re this use appears earlier for the salts of the above said compositions other than the quaternary ammonium salts. The earlier comments are equally applicable to this latter series of compositions. The quaternary salts are particularly useful in that they are ionic in character. The quaternary salts being quite stable to hydrolysis, this ionic character is not susceptible to loss through hydrolytic action.

The following examples are illustrative only and should not be construed as limiting the invention which is properly delineated in the appended claims.

EXAMPLE 1

A β-cyanoethyltrichlorosilane (65 g., 0.345 mol) in 100 ml. of dry ether was cooled in an ice bath and 100 ml. of absolute ethanol was slowly added. After 18 hours at 0° C., the mixture was diluted with 2 liters of a 50 percent solution of a low boiling commercial aliphatic hydrocarbon solvent and dry ether. The mixture was cooled in a bath of Dry Ice and acetone and the bottom phase was then separated. The compound

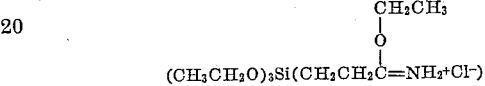

was obtained. This compound was dissolved in 150 ml. of absolute alcohol and 70 ml. (63 g., 1 mol) of anhydrous ethylene diamine was added and the mixture was refluxed for 18 hours. About 100 ml. of ethanol was removed by distillation and the residue was separated into two phases. The upper phase was distilled at reduced pressure and a 30 percent yield of theoretical of the compound

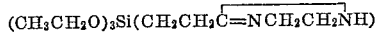

was obtained, boiling at about 112–114° C./0.7–1.0 mm. Hg.

A mixture of 6.6 g. (0.025 mol) of the compound

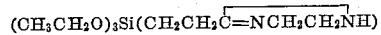

and 73 g. (.1 mol) of a hydroxyl-end-blocked dimethylsiloxane was submitted to a vacuum of 1 mm. Hg for one hour. A copolymer containing 2.4 mol percent siloxane units of the unit formula

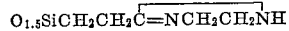

and 97.6 mol percent siloxane units of the unit formula $(CH_3)_2SiO$ was obtained. This copolymer is a clear homogeneous fluid with a viscosity of 143 c.p.s. at 25° C., $n_D$ 1.4121.

EXAMPLE 2

A mixture of 45.5 g. (0.25 mol) of a silane of the general formula $(Cl)_2(CH_3)Si(CH_2CH_2CH_2\equiv N)$, 34.5 g. (0.75 mol) of ethanol and 50 ml. of anhydrous ether was allowed to stand for 48 hours at 0° C. The solvent was then removed and the compound

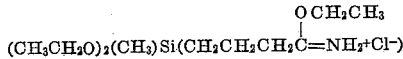

was obtained. This compound was dissolved in 45 ml. of absolute ethanol and 40 g. (.66 mol) of anhydrous ethylene diamine was added. After the initial exothermic reaction had subsided, the mixture was refluxed for 2 hours. The solvent was then removed by distillation and the mixture was separated into two layers upon cooling. The upper layer was separated into two fractions by fractional distillation at reduced pressure. The second fraction was identified as a siloxane of the unit formula

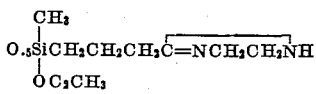

boiling point 62°/0.1 mm. Hg, $n_D^{25}=1.4830$, $D^{25}=1.035$.

EXAMPLE 3

A mixture of 222 g. of a silane of the formula $(CH_3O)_3Si(CH_2CH_2CH_2NHCH_2CH_2NH_2)$ and 106 g. of methyl orthoformate was sealed in a 1.4 liter bomb. The bomb and its contents were heated at 185° to 195° C. under autogenous pressure for 3 hours. The bomb was cooled and the contents were separated by fractional distillation at reduced pressure, yielding 146 g. of a silane of the formula

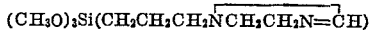

boiling at 144° C./7 mm. Hg, $n_D^{25}=1.4575$, $D^{25}=1.0650$.

A mixture of 25.5 g. (0.11 mol) of

and 5.35 g. (0.1 mol) of ammonium chloride and 100 ml. of benzene was refluxed for 16 hours. The ammonium chloride dissolved during this period. The solvent was removed to yield 20.3 g. of a compound of the formula

The product was washed several times with diethylether and dried in a vacuum, M.P. 69–72 in a sealed tube. The presence of chlorine was confirmed by elemental analysis.

EXAMPLE 4

A mixture of 220 g. of a silane of the formula $(CH_3)(CH_3O)_2Si[CH_2CH(CH_3)CH_2NHCH_2CH_2NH_2]$ and 117 g. of methyl orthoformate were reacted in accordance with the procedure of Example 3 to produce 157 g. of

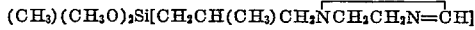

boiling at 147/9.5 mm. Hg, $n_D^{25}=1.4641$, $D^{25}=1.004$. The compound

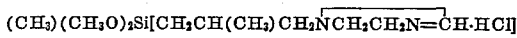

was prepared from the above compound and ammonium chloride in accordance with the procedure of Example 3.

EXAMPLE 5

3-chloro-2-methylpropyldimethylchlorosilane (371 g., 2 mols) and ethylene diamine (840 g., 14 mols) were refluxed together for 3 hours. The mass was then cooled and the layers separated. Distillation at 33 mm. Hg pressure of the top layer gave a 75 percent yield of theoretical of the compound $NH_2CH_2CH_2NCH_2CH(CH_3)CH_2Si(CH_3)_2$ Methanol, (32 g.) was slowly added to 172 g. of this compound to produce 204 g. of the compound $[NH_2CH_2CH_2NHCH_2CH(CH_3)CH_2]Si(OCH_3)(CH_3)_2$ This compound (204 g.) was mixed with 116 g. of methyl orthoformate and the procedure of Example 3 followed to produce 196 g. of the compound

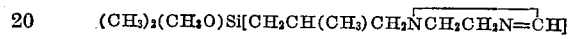

B.P. 122/12 mm. Hg, $n_D^{25}=1.4687$, $D^{25}=.9516$.

A mixture of 52.2 g. (0.23 mol) of the compound

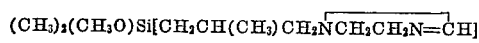

and 100 g. (1.35 mol) of a hydroxyl-end-blocked dimethylsiloxane with a hydroxyl content of 4.15 weight percent was heated for 1 hour at 100° to 120° C. and then cooled in a partial vacuum yielding 147 g. of a copolymer containing about 14.8 mol percent siloxane units of the unit formula

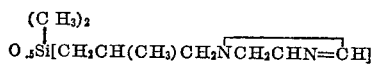

and about 85.2 mol percent siloxane units of the unit formula $(CH_3)_2SiO$. This copolymer had a viscosity of 31 cs. at 25° C., $n_D^{25}=1.4302$, $D^{25}=0.9745$, neut. equiv. 600 (calc'd 588). This copolymer emulsifies in water and is soluble in dilute acids. A copolymer (35.9 g.) containing about 14.8 mol percent siloxane units of the unit formula

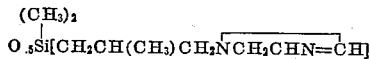

and about 85.2 mol percent siloxane units of the unit formula $(CH_3)_2SiO$ was refluxed with 100 ml. of benzene and 3.21 g. of ammonium chloride for 16 hours. The ammonium chloride dissolved during this period. The solvent was removed in a vacuum to yield 29.9 g. of a solid copolymer containing about 14.8 mol per siloxane units of the unit formula

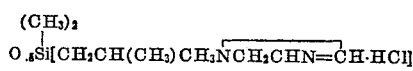

and about 85.2 mol percent siloxane units of the unit formula $(CH_3)_2SiO$. The presence of chlorine in the copolymer was confirmed by elemental analysis. Two grams of this copolymer was mixed with 98 grams of water and extracted nylon fabric was dipped in this solution. The excess material was removed by squeeze rollers. The nylon pickup was about 50 percent by weight of the solution resulting in a 1 percent by weight pickup of the copolymer. The fabric was then air-dried and cured for 5 minutes at 275° F. This treated nylon was compared with an identical untreated nylon in respect to surface resistivity. The surface resistivity of a one-inch square was measured at 65 percent relative humidity and using 100 volts applied voltage. Measurements were made at 24 and 48 hour intervals. The treated nylon had a surface resistivity after 24 hours of $7.6 \times 10^8$ ohms per square inch and after 48 hours $13.6 \times 10^8$ ohms per square inch. The untreated nylon had a surface resistivity of $10,000 \times 10^8$ ohms per square inch. The effectiveness of this material as an antistatic agent is demonstrated by this data and also by the fact that untreated cotton has a surface resistivity of $1,000 \times 10^8$ ohms and antistatic problems are not encountered with such cotton.

The surface resistivity of the following materials are reduced when treated with the above copolymer and in the same manner as above: wool, viscose rayon, copolymer of about 60 percent vinyl chloride and about 40 percent acrylonitrile, cellulose acetate rayon and polymeric ethylene glycol terephthalate.

EXAMPLE 6

Ammonium chloride (2.9 g.) was added to 102 g. of a silane of the formula

[NH$_2$CH$_2$CH$_2$NHCH$_2$CH(CH$_3$)CH$_2$]Si(CH$_3$)$_2$(OCH$_3$)

The mixture was then heated to 165° C. in a nitrogen atmosphere. Methyl orthoformate (58 g.) was slowly added and 46 g. of methanol was distilled from the reaction mass. Upon cooling, 19.9 g. of a silane of the formula

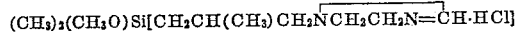

crystallized, melting point 109-112° C. The liquid layer was then distilled at reduced pressure and 80.4 g. of a silane of the formula

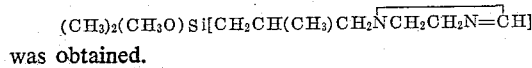

was obtained.

EXAMPLE 7

Ethanol (178 g.) was slowly added to 172 g. of the compound

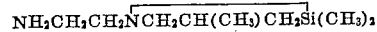

to produce 218 g. of the compound

[NH$_2$CH$_2$CH$_2$NHCH$_2$CH(CH$_3$)CH$_2$]Si(OCH$_2$CH$_3$)(CH$_3$)$_2$

This compound (218 g.) was mixed with 178 g. of ethyl orthoacetate and the mixture heated to 100° C. in a nitrogen atmosphere. After 122 g. of ethanol had distilled from the mixture, the residue was separated by fractional distillation at reduced pressure to produce 132 g. of the compound

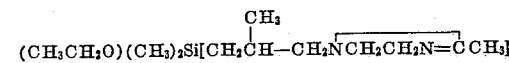

boiling at 150.5° C./12 mm. Hg, $n_D^{25}=1.4660$, $D^{25}=.9310$.

EXAMPLE 8

The following organosilicon imido ester hydrohalides are obtained when the following cyanoalkylsilanes and alcohols are substituted at the same mol ratio for the cyanoethyltrichlorosilane and ethanol of Example 1 and the procedure of Example 1 is followed.

TABLE I

| | Reactants | | Organosilicon imido ester hydrohalide |
|---|---|---|---|
| | Cyanoalkylsilane | Alcohol | |
| 1 | [N≡C(CH$_2$)$_4$]SiBr$_3$ | n-Butanol | (CH$_3$CH$_2$CH$_2$CH$_2$O)$_3$Si[(CH$_2$)$_4$C(OCH$_2$CH$_2$CH$_2$CH$_3$)=NH$_2$+Br-] |
| 2 | [N≡CCH$_2$CH(CH$_2$CH$_3$)CH$_2$]Si(CH$_3$)Cl$_2$ | n-Octanol | [CH$_3$(CH$_2$)$_7$O]$_2$Si(CH$_3$)[CH$_2$CH(CH$_2$CH$_3$)CH$_2$C(O(CH$_2$)$_7$CH$_3$)=NH$_2$+Cl-] |
| 3 | [N≡C(CH$_2$)$_6$]Si(CH$_3$)(C$_3$H$_7$)Cl | Isopropanol | [(CH$_3$)$_2$CHO]Si(CH$_3$)(C$_3$H$_7$)[(CH$_2$)$_6$C(OCH(CH$_3$)$_2$)=NH$_2$+Cl-] |
| 4 | [N≡C(CH$_2$)$_2$]Si(C$_2$H$_5$)(C$_6$H$_{11}$)Cl | Isopropanol | [(CH$_3$)$_2$CHO]Si(C$_2$H$_5$)(C$_6$H$_{11}$)[(CH$_2$)$_2$C(OCH(CH$_3$)$_2$)=NH$_2$+Cl-] |

When the following organosilicon imido ester hydrohalides and diamines are substituted at the same mol ratio for the organosilicon imido ester hydrochloride and ethylene diamine of Example 1 and the procedure of Example 1 is followed, the following (2-imidazolinyl-2-)-alkylsilanes and siloxane copolymers are obtained. The siloxane copolymer in each case contains approximately 97.6 mol per cent dimethylsiloxane units with the remaining siloxane units being of the general formula set forth in Table II.

TABLE II

| | Reactants | | | Products |
|---|---|---|---|---|
| | Organosilicon imido ester hydrohalide | Diamine | Silane | Imidazolinylalkylsiloxane units in copolymer |
| 1 | (CH₃CH₂CH₂CH₂O)₃Si[(CH₂)₄C(OCH₂CH₃)=NH₂⁺Br⁻] | NH₂CH(CH₃)CH(CH₃)NH₂ | (CH₃CH₂CH₂CH₂O)₃Si[(CH₂)₄C=NCH(CH₃)CH(CH₃)NH] | O₁.₅Si[(CH₂)₄C=NCH(CH₃)CH(CH₃)NH] |
| 2 | [CH₃(CH₂)₇O]₃Si[CH₂CH(CH₂CH₃)CH₂C(O(CH₂)₇CH₃)=NH₂⁺Cl⁻] | NH₂CH(CH₂CH₃)CH(CH₂CH₃)NH₂ | [CH₃(CH₂)₇O]₃Si[CH₂CH(CH₂CH₃)CH₂C=NCH(CH₂CH₃)CH(CH₂CH₃)NH] (CH₃) | OSi[CH₂CH(CH₂CH₃)CH₂C=NCH(CH₂CH₃)CH(CH₂CH₃)NH] |
| 3 | [(CH₃)₂CHO]Si[(CH₂)₈C(OCH(CH₃)₂)=NH₂⁺Cl⁻](C₃H₇) | NH₂CH₂CH₂NH₂ | [(CH₃)₂CHO]₂Si[(CH₂)₈C=NCH₂CH₂NH](C₃H₇) (CH₃) | O₀.₅Si[(CH₂)₈C=NCH₂CH₂NH](C₃H₇) |
| 4 | [(CH₃)₂CHO]Si[(CH₂)₃C(OCH(CH₃)₂)=NH₂⁺Cl⁻](C₆H₁₁) | NH₂CH(CH₂CH₂CH₃)CH(CH₂CH₂CH₃)NH₂ | [(CH₃)₂CHO]Si[(CH₂)₃C=NCH(CH₂CH₂CH₃)CH(CH₂CH₂CH₃)NH](C₆H₁₁) (C₂H₅) | O₀.₅Si[(CH₂)₃C=NCH(CH₂CH₂CH₃)CH(CH₂CH₂CH₃)NH](C₆H₁₁) (C₂H₅) |
| 5 | (CH₃CH₂O)₂(CH₃)Si[(CH₂)₃C(OCH₂CH₃)=NH₂⁺Cl⁻] | NH₂CH(C₆H₁₁)CH(C₆H₁₁)NH₂ | (CH₃CH₂O)₂(CH₃)Si[(CH₂)₃C=NCH(C₆H₁₁)CH(C₆H₁₁)NH] | OSi[(CH₂)₃C=NCH(C₆H₁₁)CH(C₆H₁₁)NH](CH₃) |

The following silane salts are obtained when the following silanes are refluxed with the following acids or ammonium salts of acids at a ratio of one mol of acid or salt per mol of silane.

these solutions and the excess material removed by squeeze rollers. The nylon pickup was about 50 percent by weight of the solution, resulting in a 1 percent by weight pickup of the silane salt. The fabric was then air-dried

TABLE III

| | Silane | Acid or Salt | Silane Salt |
|---|---|---|---|
| 1 | $(CH_3CH_2CH_2CH_2O)_3Si[(CH_2)_4\overline{C=NCH(CH_3)CH(CH_3)NH}]$ | HBr | $(CH_3CH_2CH_2CH_2O)_3Si[(CH_2)_4\overline{C=NCH(CH_3)CH(CH_3)NH}\cdot HBr]$ |
| 2 | $(CH_3(CH_2)_7O)_2\overset{(CH_3)}{\underset{}{Si}}[CH_2CH(CH_2CH_3)CH_2\overline{C=NCH(CH_2CH_3)CH(CH_2CH_3)NH}]$ | $C_6H_5COOH$ | $(CH_3(CH_2)_7O)_2\overset{(CH_3)}{\underset{}{Si}}[CH_2CH(CH_2CH_3)CH_2\overline{C=NCH(CH_2CH_3)CH(CH_2CH_3)NH\cdot HOOCC_6H_5}]$ |
| 3 | $(CH_3)_2CHO\overset{(CH_3)}{\underset{(C_3H_7)}{Si}}[(CH_2)_8\overline{C=NCH_2CH_2NH}]$ | $CH_3COO\text{-}NH_4^+$ | $(CH_3)_2CHO\overset{(CH_3)}{\underset{(C_3H_7)}{Si}}[(CH_2)_8\overline{C=NCH_2CH_2NH\cdot HOOCCH_3}]$ |
| 4 | $(CH_3)_2CHO\overset{C_2H_5}{\underset{C_6H_{11}}{Si}}[(CH_2)_2\overline{C=NCH(CH_2CH_2CH_3)CH(CH_2CH_2CH_3)NH}]$ | $CH_3CH_2COOH$ | $(CH_3)_2CHO\overset{C_2H_5}{\underset{C_6H_{11}}{Si}}[(CH_2)_2\overline{C=NCH(CH_2CH_2CH_3)CH(CH_2CH_2CH_3)NH}\cdot H\cdot HOOCCH_2CH_3]$ |

EXAMPLE 9

The following (1-imidazolinyl)alkylsilanes are obtained when the following aminated silanes and orthoesters are substituted at the same mol ratio for those used in Example 3 and the procedure of Example 3 is followed.

and cured for 5 minutes at 275° F. Nylon treated with these materials was compared with an identical untreated nylon in respect to surface resistivity. The surface resistivity of a one inch square was measured at 65 percent relative humidity and using 100 volts applied voltage. The

TABLE IV

| | Aminated Silane | Orthoester | Imidazolinylsilane |
|---|---|---|---|
| 1 | $(CH_3O)_3Si[(CH_2)_4NHCH(CH_3)CH_2NH_2]$ | $CH_3C(OCH_3)_3$ | $(CH_3O)_3Si[(CH_2)_4\overline{NCH(CH_3)CH_2N=CCH_3}]$ |
| 2 | $(CH_3O)_2\overset{(CH_3)}{\underset{}{Si}}[CH_2CH(CH_2CH_3)CH_2NHCH_2CH_2NH_2]$ | $CH_3CH_2C(OCH_3)_3$ | $(CH_3O)_2\overset{(CH_3)}{\underset{}{Si}}[CH_2CH(CH_2CH_3)CH_2\overline{NCH_2CH_2N=CCH_2CH_3}]$ |
| 3 | $(CH_3O)\overset{(CH_3)}{\underset{(C_6H_{11})}{Si}}[(CH_2)_8NHCH_2CH(CH_2CH_3)NH_2]$ | $CH_3C(OCH_3)_3$ | $(CH_3O)\overset{(CH_3)}{\underset{(C_6H_{11})}{Si}}[(CH_2)_8\overline{NCH_2CH(CH_2CH_3)N=CCH_3}]$ |
| 4 | $(CH_3O)_3Si[CH_2CH_2CH(NH_2)CH_2NH_2]$ | $HC(OCH_3)_3$ | $(CH_3O)_3Si[CH_2CH_2\overline{CHNHCH=NCH_2}]$ and $(CH_3O)_3Si[CH_2CH_2\overline{CHN=CHNHCH_2}]$ |
| 5 | $(CH_3O)_3Si[CH_2CH_2CH_2C(CH_3)(NH_2)CH(CH_3)NH_2]$ | $CH_3C(OCH_3)_3$ | $(CH_3O)_3Si[CH_2CH_2CH_2\overline{C(CH_3)NHC(CH_3)=NCHCH_3}]$ and $(CH_3O)_3Si[CH_2CH_2CH_2\overline{C(CH_3)N=C(CH_3)NHCHCH_3}]$ |

EXAMPLE 10

Solutions were prepared by mixing 98 g. of water with 2 g. of each of the following methoxysilane hydrochlorides. Extracted nylon fabric was dipped into each of effectiveness of these materials as antistatic agents is demonstrated by the data in the following table, and also by the fact that untreated cotton has a surface resistivity of $1,000 \times 10^8$ ohms and antistatic problems are not encountered with such cotton.

TABLE V

| Fabric | Treating Material | Surface Resistivity (ohms per sq. in.) |
|---|---|---|
| Nylon | $(CH_3O)_3Si(CH_2CH_2CH_2\overline{NCH_2CH_2N=CH}\cdot HCl)$ | $102 \times 10^8$ |
| Do | $(CH_3O)_3Si[CH_2CH(CH_3)CH_2\overline{NCH_2CH_2N=CH}\cdot HCl]$ | $238 \times 10^8$ |
| Do | $(CH_3O)(CH_3)_2Si[CH_2CH(CH_3)CH_2\overline{NCH_2CH_2N=CH}\cdot HCl]$ | $6.2 \times 10^8$ |
| Do | None | $10,000 \times 10^8$ |

EXAMPLE 11

The following quaternary ammonium silane salts are obtained when the following silanes are reacted with the following monohalohydrocarbons in the ratio of one mol of halohydrocarbon per mol of silane.

| Silane | Hydrocarbon Halide | Silane Salt |
|---|---|---|
| (a) $(C_3H_7O)_3Si[(CH_2)_4\overline{C=NCH(CH_3)CH(CH_3)NH}]$ | $C_{18}H_{37}Cl$ | $(C_3H_7O)_3Si[(CH_2)_4\overline{C=NCH(CH_3)CH(CH_3)NH}\cdot C_{18}H_{37}Cl]$ |
| (b) $\underset{(CH_3)_2}{\mid}$ $CH_3OSi[CH_2CH(CH_2CH_3)CH_2\overline{NCH_2CH_2N=CH}]$ | $CH_3I$ | $\underset{(CH_3)_2}{\mid}$ $CH_3OSi[CH_2CH(CH_2CH_3)CH_2\overline{NCH_2CH_2N=CH}\cdot CH_3I]$ |
| (c) $\underset{C_5H_{11}}{\mid}$ $(C_6H_{13}O)_2Si[(CH_2)_8\overline{C(CH_3)NHCH=N-C}(CH_2CH_3)_2]$ | 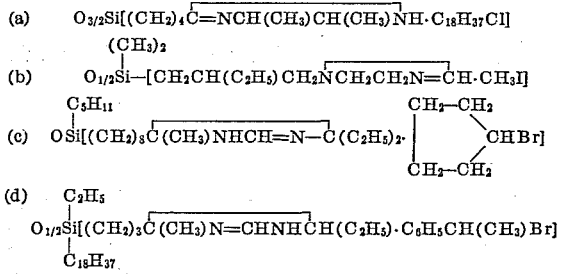 | $\underset{C_5H_{11}}{\mid}$ $(C_6H_{13}O)_2Si[(CH_2)_8\overline{C(CH_3)-NHCH=N\overset{+}{C}}\cdot (CH_2CH_3)_2\cdot \begin{bmatrix} CH_2-CH_2 \\ CH_2-CH_2 \end{bmatrix} CHBr]$ |
| (d) $\underset{CH_3}{\overset{C_2H_5}{\diagdown}}CHO\underset{C_{18}H_{37}}{\overset{C_2H_5}{\mid}}Si[(CH_2)_3\overline{C(CH_3)N=CHNHCH}(C_2H_5)]$ | $C_6H_5CH(CH_3)Br$ | $C_2H_5(CH_3)CHO\underset{C_{18}H_{37}}{\overset{C_2H_5}{\mid}}Si[(CH_2)_3\overline{C(CH_3)N=CH-NH\overset{+}{C}H}\cdot (C_2H_5)\cdot C_6H_5CH(CH_3)Br]$ |

EXAMPLE 12

Siloxanes of the unit formula shown below are formed upon hydrolysis under condensing conditions of the four silane salts shown in the preceding example:

(a) $O_{3/2}Si[(CH_2)_4\overline{C=NCH(CH_3)CH(CH_3)NH}\cdot C_{18}H_{37}Cl]$ (b) $\underset{\phantom{x}}{\overset{(CH_3)_2}{\mid}}$
$O_{1/2}Si-[CH_2CH(C_2H_5)CH_2\overline{NCH_2CH_2N=CH}\cdot CH_3I]$ (c) $\underset{\phantom{x}}{\overset{C_5H_{11}}{\mid}}$
$OSi[(CH_2)_8\overline{C(CH_3)NHCH=N-C}(C_2H_5)_2\cdot \begin{bmatrix} CH_2-CH_2 \\ CH_2-CH_2 \end{bmatrix} CHBr]$ (d) $\underset{C_{18}H_{37}}{\overset{C_2H_5}{\mid}}$
$O_{1/2}Si[(CH_2)_3\overline{C(CH_3)N=CHNHCH}(C_2H_5)\cdot C_6H_5CH(CH_3)Br]$

EXAMPLE 13

104.4 grams of imidazolinylsilane (b) of Example 11 and 200 grams of a hydroxyl-end-blocked dimethylpolysiloxane were submitted to a vacuum of 1 mm. for one hour. A clear copolymer was obtained. Treatment of 75 g. of the copolymer with 26.8 g. of methyl iodide resulted in an exothermic reaction and gave a dimethylsiloxane polymer end-blocked with units of the structure $\underset{\phantom{x}}{\overset{(CH_3)_2}{\mid}}$
$C_{1/2}Si[CH_2CH(C_2H_5)CH_2\overline{NCH_2CH_2N=CH}\cdot CH_3I]$ When the above nitrogen-containing siloxane copolymer is substituted for the copolymer used in Example 5 for the treatment of nylon, a similarly effective reduction in surface resistivity is obtained.

EXAMPLE 14

When the following methoxysilane quaternary halides are substituted for the methoxysilane hydrochlorides in Example 10, similar low surface resistivity values are obtained on the treated fabric:

$(MeO)_3SiCH_2CH(Me)CH_2\overline{NCH_2CH_2N=CH}\cdot CH_3I$ $\underset{\phantom{x}}{\overset{Me}{\mid}}$
$(MeO)_2SiCH_2CH_2\overline{NCH_2CH_2N=CH}\cdot CH_3I$ $\underset{\phantom{x}}{\overset{Me_2}{\mid}}$
$MeOSiCH_2CH(Me)CH_2\overline{NCH_2CH_2N=CH}\cdot CH_3I$ That which is claimed is:

1. A nitrogen-containing compound of the general formula $$(R'O)_{3-b}\underset{\underset{(R'')_b}{\mid}}{Si}(R\overline{\overset{R'}{\underset{\mid}{C}}=NH_2^+X^-})$$

wherein R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least two carbon atoms between the silicon atom and the carbon atom which is bonded to nitrogen, X is a halogen atom selected from the group consisting of chlorine, bromine and iodine atoms and b is an integer of less than 4.

2. A nitrogen-containing compound as defined in claim 1 wherein R' is an alkyl radical of from 1 to 4 inclusive carbon atoms, R'' is an alkyl radical, R is selected from the group consisting of the —CH$_2$CH$_2$— and —CH$_2$CH$_2$CH$_2$— radicals, and X is a chlorine atom.

3. A nitrogen-containing compound as defined in claim 2 wherein R' is an ethyl radical and b has a value of 1.

4. A nitrogen-containing compound of the general formula $$(R'O)_{3-b}\underset{\underset{(R'')_b}{\mid}}{Si}(RZ)$$

wherein R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least two carbon atoms between the Z group and the silicon atom, Z is selected from the group consisting of $-\overline{C=NCY_2CY_2NY}$, $-\overline{NCY_2CY_2N=CY}$, $-\overline{CYNYCY=NCY_2}$ and $-\overline{CYN=CYNYCY_2}$ radicals, wherein Y is selected from the group consisting of hydrogen atoms and monovalent saturated hydrocarbon radicals and b is an integer of less than 4.

5. A nitrogen-containing compound as defined in claim 4 wherein R' is an alkyl radical of from 1 to 4 inclusive carbon atoms, R'' is an alkyl radical, R is selected from the group consisting of the —CH$_2$CH$_2$— and

—CH$_2$CH$_2$CH$_2$— radicals, and Z is

6. A nitrogen-containing compound as defined in claim 4 wherein R' is an alkyl radical of from 1 to 4 inclusive carbon atoms, R'' is an alkyl radical, R is selected from the group consisting of the —CH$_2$CH$_2$— and

—CH$_2$CH$_2$CH$_2$— radicals, and Z is

7. A nitrogen-containing siloxane of the unit formula

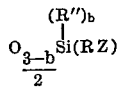

wherein R'' is a monovalent saturated hydrocarbon radical, R is a divalent saturated aliphatic hydrocarbon radical containing at least 2 carbon atoms, there being at least two carbon atoms between the Z radical and the silicon atom, Z is selected from the group consisting of

and

radicals, wherein Y is selected from the group consisting of hydrogen atoms and monovalent saturated hydrocarbon radicals and $b$ has an average value of less than 3.

8. A nitrogen-containing siloxane as defined in claim 7 wherein R'' is an alkyl radical, R is selected from the group consisting of the —CH$_2$CH$_2$— and

—CH$_2$CH$_2$CH$_2$— radicals, Z is

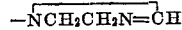

and $b$ has an average value of from 1 to 2 inclusive.

9. A nitrogen-containing siloxane copolymer consisting essentially of (I) at least one unit of the formula

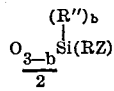

wherein R'' is a monovalent saturated hydrocarbon radical, R is a divalent saturated aliphatic hydrocarbon radical containing at least 2 carbon atoms, there being at least two carbon atoms between the Z radical and the silicon atom, Z is selected from the group consisting of

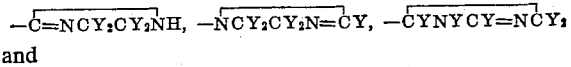
and

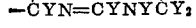

radicals, wherein Y is selected from the group consisting of hydrogen atoms and monovalent saturated hydrocarbon radicals and $b$ has an average value of less than 3, and (II) units of the formula R'''$_x$SiO$_{\frac{4-x}{2}}$ wherein R''' is selected from the group consisting of monovalent hydrocarbon and monovalent halogenated hydrocarbon radicals and $x$ has an average value of from 1 to 3 inclusive.

10. A nitrogen-containing siloxane copolymer as defined in claim 9 wherein R'' is an alkyl radical, R is selected from the group consisting of the —CH$_2$CH$_2$— and —CH$_2$CH$_2$CH$_2$— radicals, $b$ has an average value of from 1 to 2 inclusive, and R''' is an alkyl radical.

11. A nitrogen-containing compound of the general formula

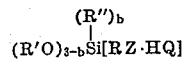

wherein R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least two carbon atoms between the Z radical and the silicon atom, Z is selected from the group consisting of

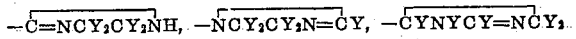
and

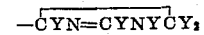

radicals, wherein Y is selected from the group consisting of hydrogen atoms and monovalent saturated hydrocarbon radicals, Q is selected from the group consisting of halogen atoms and

radicals wherein M is selected from the group consisting of alkyl and phenyl radicals and $b$ is an integer of less than 4.

12. A nitrogen-containing compound as defined in claim 11 wherein R' is an alkyl radical of from 1 to 4 inclusive carbon atoms, R'' is an alkyl radical, R is selected from the group consisting of the —CH$_2$CH$_2$— and —CH$_2$CH$_2$CH$_2$— radicals, Z is

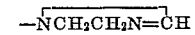

and Q is a chlorine atom.

13. A nitrogen-containing siloxane of the unit formula

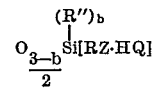

wherein R'' is a monovalent saturated hydrocarbon radical, R is a divalent saturated aliphatic hydrocarbon radical containing at least 2 carbon atoms, there being at least 2 carbon atoms between the Z radical and the silicon atom, Z is selected from the group consisting of

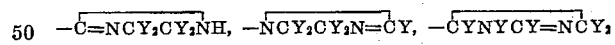
and

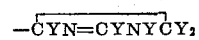

radicals, wherein Y is selected from the group consisting of hydrogen atoms and monovalent saturated hydrocarbon radicals, Q is selected from the group consisting of halogen atoms and

radicals, wherein M is selected from the group consisting of alkyl and phenyl radicals and $b$ has an average value of less than 3.

14. A nitrogen-containing siloxane as defined in claim 13 wherein R'' is an alkyl radical, R is selected from the group consisting of the —CH$_2$CH$_2$— and

—CH$_2$CH$_2$CH$_2$— radicals, Z is

Q is a chlorine atom, and $b$ has an average value of from 1 to 2 inclusive.

15. A nitrogen-containing siloxane copolymer consisting essentially of (I) at least one unit of the formula $$O_{\frac{3-b}{2}}\overset{(R'')_b}{\underset{|}{Si}}(RZ\cdot HQ)$$

wherein R'' is a monovalent saturated hydrocarbon radical, R is a divalent saturated aliphatic hydrocarbon radical containing at least 2 carbon atoms, there being at least 2 carbon atoms between the Z radical and the silicon atom, Z is selected from the group consisting of $$-\overline{\overset{}{C}=NCY_2CY_2NH}, \quad -\overline{NCY_2CY_2N=\overset{}{C}Y}, \quad -\overline{\overset{}{C}YNYCY=N\overset{}{C}Y_2}$$

and $$-\overline{\overset{}{C}YN=CYNY\overset{}{C}Y_2}$$

radicals, wherein Y is selected from the group consisting of hydrogen atoms and monovalent saturated hydrocarbon radicals, Q is selected from the group consisting of halogen atoms and $$\overset{O}{\underset{\|}{M\overset{}{C}O-}}$$

radicals, wherein M is selected from the group consisting of alkyl and phenyl radicals and $b$ has an average value of less than 3 and (II) units of the general formula $$R'''_xSiO_{\frac{4-x}{4}}$$

wherein R''' is selected from the group consisting of monovalent hydrocarbon and monovalent halogenated hydrocarbon radicals and $x$ has an average value of from 1 to 3 inclusive.

16. A nitrogen-containing siloxane copolymer as defined in claim 15 wherein R'' is an alkyl radical, R is selected from the group consisting of the —CH₂CH₂— and —CH₂CH₂CH₂— radicals, Z is $$-\overline{NCH_2CH_2N=\overset{}{C}H}$$

Q is a chlorine atom, $b$ has an average value of from 1 to 2 inclusive, and R''' is an alkyl radical.

17. A method for producing a nitrogen-containing silane of the general formula $$(R'O)_{3-b}\overset{(R'')_b}{\underset{|}{Si}}(R\overline{\overset{}{C}=NCY_2CY_2NH})$$

wherein R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least two carbon atoms between the $$-\overline{\overset{}{C}=NCY_2CY_2NH}$$

radical and the silicon atom, Y is selected from the group consisting of hydrogen atoms and monovalent saturated hydrocarbon radicals and $b$ is an integer of less than 4, which comprises
(A) mixing in an inert solvent
 (1) a compound selected from the group consisting of
  (a) cyanoalkylsilanes of the general formula $$X_{3-b}\overset{(R'')_b}{\underset{|}{Si}}(RC\equiv N)$$

and
  (b) a mixture of a cyanoalkylsilane of the general formula $$(R'O)_{3-b}\overset{(R'')_b}{\underset{|}{Si}}(RC\equiv N)$$

and an acid of the formula HX, there being at least one mol of said acid per mol of cyanoalkylsilane,
wherein R, R', R'' and $b$ are as defined above, there being at least two carbon atoms between the —C≡N radical and the silicon atom, X is a halogen atom selected from the group consisting of chlorine, bromine and iodine atoms and
 (2) an alcohol of the general formula R'OH, wherein R' is as defined above and
(B) then mixing the product obtained in (A) with a diamine of the formula NH₂CY₂CY₂NH₂, wherein Y is as defined above and then heating the reaction mass at a temperature sufficiently elevated to effect the desired reaction and to remove the ammonia produced during the reaction.

18. A method for producing a nitrogen-containing compound of the general formula $$(R'O)_{3-b}\overset{(R'')_b}{\underset{|}{Si}}(R\overline{\overset{}{C}=NCH_2CH_2NH})$$

wherein R' is an alkyl radical of from 1 to 4 inclusive carbon atoms, R'' is an alkyl radical, R is a divalent saturated aliphatic hydrocarbon radical containing from 2 to 3 inclusive carbon atoms, there being at least two carbon atoms between the $$-\overline{\overset{}{C}=NCH_2CH_2NH}$$

group and the silicon atom, and $b$ has a value of less than 3, which comprises
(A) mixing in an inert solvent
 (1) a cyanoalkylsilane of the general formula $$Cl_{3-b}\overset{(R'')_b}{\underset{|}{Si}}(RC\equiv N)$$

and
 (2) an alcohol of the general formula R'OH wherein R, R', R'' and $b$ are as defined above, there being at least two carbon atoms between the —C≡N group and the silicon atom and
(B) then mixing the product obtained in (A) with ethylene diamine and then heating the reaction mass to a temperature sufficiently elevated to effect the desired reaction and to remove the ammonia produced from the reaction.

19. A method for producing a nitrogen-containing compound of the general formula $$(R'O)_{3-b}\overset{(R'')_b}{\underset{|}{Si}}(R\overline{NCY_2CY_2N=\overset{}{C}Y})$$

wherein R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least two carbon atoms between the $$-\overline{NCY_2CY_2N=\overset{}{C}Y}$$

and the silicon atom, Y is selected from the group consisting of hydrogen and monovalent hydrocarbon radicals and $b$ is an integer of less than 4, which comprises
(A) mixing
 (1) an aminoalkylsilane of the general formula $$(R'O)_{3-b}\overset{(R'')_b}{\underset{|}{Si}}(RNHCY_2CY_2NH_2)$$

and
 (2) an orthoester of the general formula $$YC(OZ')_3$$

wherein R, R', R'', Y and $b$ are as defined above, there being at least two carbon atoms between the —NHCY₂CY₂NH₂ group and the silicon atom and Z' is a monovalent hydrocarbon radical, and
(B) then heating the reaction mass to a temperature sufficiently elevated to effect a desired reaction.

20. A method for producing a nitrogen-containing compound of the general formula $$(R'O)_{3-b}\underset{|}{\overset{(R'')_b}{Si}}(R\overline{NCH_2CH_2N{=}CH})$$

wherein R' is an alkyl radical of from 1 to 4 inclusive carbon atoms, R'' is an alkyl radical, R is a divalent saturated aliphatic hydrocarbon radical containing from 2 to 3 inclusive carbon atoms, there being at least two carbon atoms between the $$-\overline{NCH_2CH_2N{=}CH}$$

group and the silicon atom and b is an integer of less than 3, which comprises
 (A) mixing
  (1) an aminoalkylsilane of the general formula $$(R'O)_{3-b}\underset{|}{\overset{(R'')_b}{Si}}(RNHCH_2CH_2NH_2)$$

and
  (2) an orthoester of the general formula $$HC(OZ')_3$$

wherein R, R', R'' and b are as defined above, there being at least two carbon atoms between the —NHCH₂CH₂NH₂ group and the silicon atom and Z' is an alkyl radical of from 1 to 4 carbon atoms, and
 (B) then heating the reaction mass at a temperature between 100 and 250° C. for a sufficient time to effect the desired reaction.

21. An organic article which, in a dry state, normally has a tendency to accumulate static charges of electricity thereon, said article having deposited at least on the outer surfaces thereof an antistatic composition selected from the group consisting of compounds of the general formulae
(1)

$$(R'O)_{3-b}\underset{|}{\overset{(R'')_b}{Si}}(RZ\cdot HQ)$$

(2)

$$\underset{2}{O_{3-b}}\underset{|}{\overset{(R'')_b}{Si}}(RZ\cdot HQ)$$

and (3) copolymers consisting essentially of (I) at least one unit of the formula $$\underset{2}{O_{3-b}}\underset{|}{\overset{(R'')_b}{Si}}(RZ\cdot HQ)$$

and (II) units of the general formula $$R'''_x SiO_{\frac{4-x}{2}}$$

wherein R''' is selected from the group consisting of monovalent hydrocarbon and monovalent halogenated hydrocarbon radicals, x has an average value of from 1 to 3 inclusive, R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least 2 carbon atoms between the Z radical and the silicon atom, Z is selected from the group consisting of $$-\overline{C{=}NCY_2CY_2NH},\ -\overline{NCY_2CY_2N{=}CY},\ -\overline{CYNYCY{=}NCY_2}$$

and $$-\overline{CYN{=}CYNYCY_2}$$

radicals wherein Y is selected from the group consisting of hydrogen atoms and monovalent saturated hydrocarbon radicals, Q is selected from the group consisting of halogen atoms and $$\overset{O}{\underset{\|}{MC}}O-$$

radicals, wherein M is selected from the group consisting of alkyl and phenyl radicals and b has an average value of less than 3, said antistatic composition that is held by the treated article being from 0.2 to 10 percent by weight based on the weight of the dried, untreated article.

22. A nitrogen-containing compound of the general formula $$(R'O)_{3-b}\underset{|}{\overset{(R'')_b}{Si}}[R Z\cdot AB]$$

wherein R' is a monovalent hydrocarbon radical containing no aliphatic unsaturation, R'' is a monovalent saturated hydrocarbon radical, R is a divalent saturated aliphatic hydrocarbon radical containing at least two carbon atoms, there being at least two carbon atoms between the Z radical and the silicon atom, Z is selected from the group consisting of $$-\overline{C{=}NCY_2CY_2NH},\ -\overline{NCY_2CY_2N{=}CY},\ -\overline{CYNYCY{=}NCY_2}$$

and $$-\overline{CYN{=}CYNYCY_2}$$

radicals, wherein each Y is selected from the group consisting of hydrogen atoms and monovalent saturated hydrocarbon radicals, A is selected from the group consisting of alkyl, aralkyl and cycloalkyl radicals, B is a halogen atom, and b is an integer of less than 4.

23. A nitrogen-containing compound of the general formula $$(R'O)_{3-b}\underset{|}{\overset{(R'')_b}{Si}}R-\overline{NCH_2CH_2N{=}CH}\cdot AB$$

wherein R' is an alkyl radical, R'' is an alkyl radical, R is an alkylene radical of at least two carbon atoms, there being at least two carbon atoms between the nitrogen atom and the silicon atom, A is an alkyl radical, B is a halogen atom and b is an integer of less than 4.

24. The compound of the formula $$(CH_3O)_3SiCH_2CH(CH_3)CH_2\overline{NCH_2CH_2N{=}CH}\cdot CH_3I$$

25. A nitrogen-containing siloxane of the unit formula $$\underset{2}{O_{3-b}}\underset{|}{\overset{(R'')_b}{Si}}[RZ\cdot AB]$$

wherein R'' is a monovalent saturated hydrocarbon radical, R is a divalent saturated aliphatic hydrocarbon radical containing at least two carbon atoms, there being at least two carbon atoms between the Z radical and the silicon atom, Z is selected from the group consisting of $$-\overline{C{=}NCY_2CY_2NH},\ -\overline{NCY_2CY_2N{=}CY},\ -\overline{CYNYCY{=}NCY_2}$$

and $$-\overline{CYN{=}CYNYCY_2}$$

radicals, wherein Y is selected from the group consisting of hydrogen atoms and monovalent saturated hydrocarbon radicals, A is selected from the group consisting of alkyl, aralkyl and cycloalkyl radicals, B is a halogen atom, and b has an average value of less than 3.

26. A nitrogen-containing siloxane of the unit formula $$\underset{2}{O_{3-b}}\underset{|}{\overset{(R'')_b}{Si}}[R-\overline{NCH_2CH_2N{=}CH}\cdot AB]$$

wherein R'' is an alkyl radical, R is an alkylene radical of at least two carbon atoms, there being at least two carbon atoms between the silicon atom and the nitrogen atom, A is an alkyl radical, B is a halogen atom and $b$ has a value of less than 3.

27. The siloxane of the unit formula

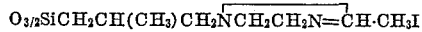
O₃/₂SiCH₂CH(CH₃)CH₂NCH₂CH₂N=CH·CH₃I

28. A nitrogen-containing siloxane copolymer consisting essentially of (I) at least one unit of the formula

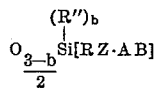
$$\frac{O_{3-b}}{2}\overset{(R'')_b}{\underset{|}{Si}}[RZ \cdot AB]$$

wherein R'' is a monovalent saturated hydrocarbon radical, R is a divalent saturated hydrocarbon radical containing at least two carbon atoms, there being at least two carbon atoms between the Z radical and the silicon atom, Z is selected from the group consisting of

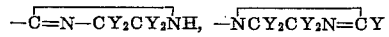
—C̄=N—CY₂CY₂N̄H, —N̄CY₂CY₂N=C̄Y

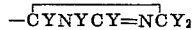
—C̄YNYCY=NC̄Y₂ and

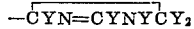
—C̄YN=CYNYC̄Y₂ radicals, wherein Y is selected from the group consisting of hydrogen atoms and saturated hydrocarbon radicals, A is selected from the group consisting of alkyl, aralkyl and cycloalkyl radicals, B is a halogen atom and $b$ has an average value of less than 3 and (II) units of the general formula $$R'''_xSiO_{\frac{4-x}{2}}$$

wherein R''' is selected from the group consisting of monovalent hydrocarbon and monovalent halogenated hydrocarbon radicals and $x$ has an average value of from 1 to 3 inclusive.

29. A nitrogen-containing siloxane copolymer consisting essentially of (I) at least one unit of the formula

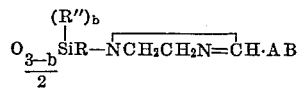
$$\frac{O_{3-b}}{2}\overset{(R'')_b}{\underset{|}{Si}}R-NCH_2CH_2N=CH\cdot AB$$

wherein R'' is an alkyl radical, R is an alkylene radical containing at least two carbon atoms, there being at least two carbon atoms between the nitrogen atom and the silicon atom, A is an alkyl radical, B is a halogen and $b$ has an average value of less than 3 and (II) units of the formula $$R'''_xSiO_{\frac{4-x}{2}}$$

wherein R''' is an alkyl radical and $x$ has a value of from 1 to 3 inclusive.

30. A nitrogen-containing siloxane copolymer consisting essentially of (I) at least one unit of the structure

$$O_{1/2}\overset{(CH_3)_2}{\underset{|}{Si}}CH_2CH(CH_3)CH_2\overline{NCH_2CH_2N=CH\cdot CH_3I}$$

and (II) units of the structure (CH₃)₂SiO.

31. An organic article which, in a dry state, normally has a tendency to accumulate static charges of electricity thereon, said article having deposited at least on the outer surfaces thereof an antistatic composition selected from the group consisting of compounds of the general formula (1)

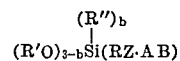
$$(R'O)_{3-b}\overset{(R'')_b}{\underset{|}{Si}}(RZ \cdot AB)$$

(2)

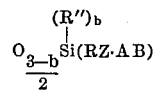
$$\frac{O_{3-b}}{2}\overset{(R'')_b}{\underset{|}{Si}}(RZ \cdot AB)$$

and (3) copolymers consisting essentially of (I) at least one unit of the formula

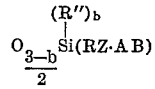
$$\frac{O_{3-b}}{2}\overset{(R'')_b}{\underset{|}{Si}}(RZ \cdot AB)$$

and (II) units of the general formula $$R'''_xSiO_{\frac{4-x}{2}}$$

wherein R''' is selected from the group consisting of monovalent hydrocarbon and monovalent halogenated hydrocarbon radicals, $x$ has an average value of from 1 to 3 inclusive, R' is a monovalent hydrocarbon radical containing no aliphatic unsaturation, R'' is a monovalent saturated hydrocarbon radical, R is a divalent saturated hydrocarbon radical containing at least two carbon atoms, there being at least two carbon atoms between the Z radical and the silicon atom, Z is selected from the group consisting of

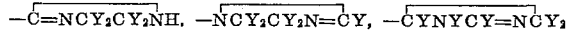
—C̄=NCY₂CY₂N̄H, —N̄CY₂CY₂N=C̄Y, —C̄YNYCY=NC̄Y₂ and

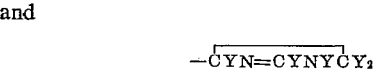
—C̄YN=CYNYC̄Y₂ radicals, wherein Y is selected from the group consisting of hydrogen atoms and monovalent saturated hydrocarbon radicals, A is selected from the group consisting of alkyl, cycloalkyl and aralkyl radicals, B is a halogen atom and $b$ has an average value of less than 3, said antistatic composition that is held by the treated article being from 0.2 to 10 percent by weight based on the weight of the dried untreated article.

References Cited

UNITED STATES PATENTS

| | | | |
|---|---|---|---|
| 2,129,281 | 9/1938 | Lincoln et al. | 260—448.8 |
| 2,541,154 | 2/1951 | Clapsadle | 260—448.8 |
| 2,566,363 | 9/1951 | Pedlow et al. | 260—448.8 |
| 2,610,198 | 9/1952 | Sommer | 260—448.8 |
| 2,611,778 | 9/1952 | Speier | 600—448.8 |
| 2,703,324 | 3/1955 | Binkley et al. | 260—309.6 |
| 2,859,135 | 11/1958 | Rossin | 117—139.5 |
| 2,868,802 | 1/1959 | Hueni | 260—309.6 |
| 2,881,184 | 4/1959 | Pike | 260—448.2 |
| 2,938,038 | 5/1960 | Hirt | 260—309.6 |
| 2,973,383 | 2/1961 | Black | 260—448.8 |
| 3,068,152 | 12/1962 | Black | 260—448.8 |
| 3,053,696 | 9/1962 | Touey et al. | 117—139.5 |
| 3,101,277 | 8/1963 | Eder et al. | 260—448.8 |

FOREIGN PATENTS 1,360,395   3/1964   France.

DONALD E. CZAJA, *Primary Examiner.*

NICHOLAS S. RIZZO, LEON J. BERCOVITZ,
*Examiners.*

N. TROUSOF, M. I. MARQUIS, *Assistant Examiners.*